(12) United States Patent
Naedler (10) Patent No.: US 12,486,901 B1
(45) Date of Patent: Dec. 2, 2025

(54) ADJUSTABLE HIGH PRESSURE PACKING ASSEMBLY

(71) Applicant: Mark Naedler, Cypress, TX (US)

(72) Inventor: Mark Naedler, Cypress, TX (US)

(73) Assignee: THIRD COAST INNOVATION LLC, Cypress, TX (US)

( * ) Notice: Subject to any disclaimer, the term of this patent is extended or adjusted under 35 U.S.C. 154(b) by 0 days.

(21) Appl. No.: 18/467,323

(22) Filed: Sep. 14, 2023

Related U.S. Application Data (60) Provisional application No. 63/411,220, filed on Sep. 29, 2022.

(51) Int. Cl.
*F16J 15/18* (2006.01)
*F04B 19/22* (2006.01)
*F04B 53/02* (2006.01)

(52) U.S. Cl.
CPC .............. *F16J 15/18* (2013.01); *F04B 19/22* (2013.01); *F04B 53/02* (2013.01)

(58) Field of Classification Search
CPC ........... F16J 15/18; F16J 15/181; F16J 15/184
See application file for complete search history.

(56) References Cited

U.S. PATENT DOCUMENTS

| | | | | |
|---|---|---|---|---|
| 230,986 | A * | 8/1880 | Armstrong | F16J 15/186 277/537 |
| 1,079,857 | A * | 11/1913 | Huhn | F16J 15/22 277/541 |
| 3,227,464 | A * | 1/1966 | Makin | F16J 15/20 277/531 |
| 3,351,350 | A | 11/1967 | Shepler | |
| 3,920,252 | A * | 11/1975 | Dechavanne | F16J 15/3232 277/491 |
| 4,143,586 | A | 3/1979 | Zitting | |
| 4,169,604 | A | 10/1979 | Heathcott | |
| 4,177,998 | A * | 12/1979 | Laitkep | F16J 15/40 277/516 |
| 4,327,923 | A * | 5/1982 | Chesterton | F16J 15/20 277/537 |
| 4,440,404 | A | 4/1984 | Roach et al. | |
| 4,470,607 | A | 9/1984 | Schier et al. | |
| 6,062,570 | A * | 5/2000 | Erickson | F16K 41/02 277/516 |
| 6,182,974 | B1 * | 2/2001 | Harrelson, III | F16J 15/26 277/548 |

(Continued)

FOREIGN PATENT DOCUMENTS

CN 103557136 B 4/2016
DE 8001656 U1 12/1981

(Continued)

*Primary Examiner* — Gilbert Y Lee
(74) *Attorney, Agent, or Firm* — Nolte Lackenbach Siegel (57) ABSTRACT

A packing assembly to be disposed within a stuffing box defined by a fluid end of a body of a reciprocating plunger pump includes an elastomeric component and a wear component. The elastomeric component has an at least partially tapered inner diameter and an outer diameter and, in use, engages the stuffing box on the outer diameter and is axially compressed within the stuffing box. The wear component sealably engaging the elastomeric component across the at least partially tapered inner diameter and dynamically contacts the plunger to form a dynamic seal.

6 Claims, 10 Drawing Sheets

(56) References Cited

U.S. PATENT DOCUMENTS

| | | | |
|---|---|---|---|
| 6,544,012 B1 * | 4/2003 | Blume | F04B 53/164 |
| | | | 417/454 |
| 7,341,258 B2 | 3/2008 | Holt et al. | |
| 7,568,424 B2 | 8/2009 | Hopkins et al. | |
| 8,573,112 B2 | 11/2013 | Nakayama et al. | |
| 8,672,418 B2 | 3/2014 | Harada et al. | |
| 9,016,693 B1 | 4/2015 | Shek et al. | |
| 9,543,691 B2 | 1/2017 | Watkins | |
| 9,638,330 B2 | 5/2017 | Itou | |
| 10,151,311 B2 | 12/2018 | Chacko et al. | |
| 2002/0074739 A1 * | 6/2002 | Mattina | F16J 15/20 |
| | | | 277/603 |
| 2003/0214100 A1 * | 11/2003 | Pippert | F16J 15/185 |
| | | | 277/510 |
| 2003/0227139 A1 * | 12/2003 | Antoun | F16J 15/185 |
| | | | 277/467 |
| 2004/0150168 A1 | 8/2004 | Heathcott et al. | |
| 2009/0166980 A1 * | 7/2009 | Miller | F16J 15/20 |
| | | | 277/540 |
| 2018/0156208 A1 * | 6/2018 | Mahieux | F04B 53/144 |
| 2021/0381598 A1 | 12/2021 | Flade | |

FOREIGN PATENT DOCUMENTS

| | | |
|---|---|---|
| DE | 102019210261 A1 | 1/2021 |
| JP | 1151193 A | 2/1999 |
| JP | 1172061 A | 3/1999 |
| KR | 101939647 B1 | 1/2019 |

\* cited by examiner

ADJUSTABLE HIGH PRESSURE PACKING ASSEMBLY

CROSS-REFERENCE TO RELATED APPLICATIONS

This application claims priority to and the earlier effective filing date of U.S. Application Ser. No. 63/411,220, filed Sep. 29, 2022, in the name of Mark Naedler, which is hereby incorporate by reference for all purposes, including the purpose of priority, as if expressly set forth verbatim herein.

STATEMENT REGARDING FEDERALLY SPONSORED RESEARCH OR DEVELOPMENT

Not applicable.

BACKGROUND

Hydrocarbon wells use pumps for various tasks during drilling, fracturing ("fracking"), and completion. For present purposes, these pumps will be referred to as "well service pumps". During drilling, fluids referred to as "drilling muds", or "muds", are circulated through the well bore to stabilize the well bore, lubricate moving parts of the drill string, and help remove cuttings or fines. Drilling muds typically include a carrier fluid and a number of additives that may be caustic or acidic to the associated machinery. Fracking operations typically involve circulating fracking fluids through the well bore for use in stimulating the well bore. The fracking fluid may include a carrier fluid and one or more proppants. These proppants typically are abrasive and wear on the associated machinery.

Well service pumps may be used for circulating these and other fluids during various phases of the well's life. The nature of these operations and the fluid involved results in adaptations that distinguish well service pumps from many pumps used in other contexts. For example, well service pumps are designed to handle high pressure fluids. As used herein, the term "high pressure" means several thousands of pounds per square inch ("psi"), and up to 15,000 psi ("pounds per square inch") or more. Well service pumps are also adapted to handle slurries, or fluids with entrained particulates, such as drilling muds, cements, and fracking fluids, among others, at high pressure. Furthermore, the fluid handled by well service pumps are frequently acidic to the pumps as discussed above.

SUMMARY

In one aspect, a packing assembly to be disposed within a stuffing box defined by a fluid end of a body of a reciprocating plunger pump, comprises an elastomeric component and a wear component. The elastomeric component has an at least partially tapered inner diameter and an outer diameter and engages the stuffing box on the outer diameter. The wear component has an outer diameter that sealably engages the elastomeric component across the at least partially tapered inner diameter of the elastomeric component and an inner diameter that dynamically contacts the plunger to form a dynamic seal.

In a second aspect, a packing assembly comprises a plastic wear ring, an elastomeric ring, and a second plastic wear ring. The first plastic wear ring has an inner diameter and at least a partially tapered outer diameter. The elastomeric ring has an outer diameter and at least a partially tapered inner diameter on a first end to engage the outer diameter of the wear ring, and at least a partially tapered inner diameter on a second end. The second plastic ring with an inner diameter and at least a partially tapered outer diameter to engage the second end of the elastomeric ring.

In another aspect, a reciprocating plunger pump comprises a plunger, a body having a fluid end defining a stuffing box sealably receiving the plunger, a packing assembly disposed within the stuffing box, and an axial compressing means. The packing assembly includes an elastomeric component and a wear component. The elastomeric component has an at least partially tapered inner diameter and an outer diameter and engages the stuffing box on the outer diameter. The wear component has an outer diameter that sealably engages the elastomeric component across the at least partially tapered inner diameter of the elastomeric component and an inner diameter that dynamically contacts the plunger to form a dynamic seal. A means for axially compressing the elastomeric component compresses the elastomeric component within the stuffing box.

The above presents a simplified summary in order to provide a basic understanding of some aspects of what is claimed below. This summary is not an exhaustive overview of the claimed subject matter. It is not intended to identify key or critical elements of the disclosure or to delineate the scope of the claims. Its sole purpose is to present some concepts in a simplified form as a prelude to the more detailed description that is discussed later.

BRIEF DESCRIPTION OF THE DRAWINGS

The subject matter disclosed below may be understood by reference to the following description taken in conjunction with the accompanying drawings, in which like reference numerals identify like elements, and in which.

While the disclosed technique is susceptible to various modifications and alternative forms, the drawings illustrate specific embodiments herein described in detail by way of example. It should be understood, however, that the description herein of specific embodiments is not intended to limit that which is claimed to the particular forms disclosed, but on the contrary, the intention is to cover all modifications, equivalents, and alternatives falling within the spirit and scope of the appended claims.

DETAILED DESCRIPTION

The kinds of operating conditions discussed above with respect to well service pumps exacerbate problems such as sealing, lubrication, and durability. Techniques useful in pumps for other applications and environments are therefore frequently unsuited for use in well service pumps. Accordingly, techniques for performing these functions in well service pumps have had to be developed.

For example, traditional well service pumps most often use a stack of V-rings, also known as chevrons, to sealably engage the plunger. In reciprocating plunger pumps, a plunger reciprocates in a stuffing box to displace the fluid, and the stacked V-rings provide a seal between the plunger and the stuffing box. One example of such a well service pump is disclosed in U.S. Pat. No. 4,440,404 to Halliburton Company as the assignee James D. Roach and Clinton W. Cole ("Roach"). These stacked V-rings are most often made of a composite material of wear fabrics such as aramid and an elastomer binder. Contact pressures with the plunger and stuffing box are concentrated and high.

However, traditional designs such as though represented by Roach still present a number of issues. For example, the coefficient of friction between the seals and the plunger is still relatively high. It would be desirable to reduce the coefficient of friction. The traditional packing with high contact pressure and high coefficients of friction also requires constant lubrication be maintained to prevent the packing from rapid failure.

A packing assembly for use in a reciprocating plunger pump is disclosed herein to address these and/or other issues found in conventional well service pumps. The packing assembly disclosed below utilizes an elastomeric component to serve as an energizer and sealing component within a reciprocating plunger pump's stuffing box. A wear component sealably engages the elastomeric component across a tapered surface and dynamically contacts the plunger for forming a dynamic seal.

The stuffing box is an annular passage within the pump's metallic fluid end and sealably receives the plunger. The sealing assembly, also known as the packing, engages the plunger on the packing inner diameter ("ID") and engages the stuffing box on the packing outer diameter ("OD"). The packing is axially constrained by a radial shoulder forming the stuffing box within the fluid end, and opposite the radial shoulder on the other side of the packing is a threaded and adjustable gland nut that when tightened, axially compresses the packing within the stuffing box between the radial shoulder and the gland nut.

The free shape of the packing assembly can have a volume such that when fully compressed, occupies nearly 100% of the stuffing box volume. The free state of the elastomeric component and wear component are also designed so that when compressed, any contact exposure of the elastomeric component to the plunger is minimized by putting the wear component between the elastomeric component and the plunger. Having a volume fill substantially less than 100% upon adjusting a gland nut is undesirable because voids within the stuffing box may allow movement during pressure pulsations, especially from the elastomeric component which promotes wear and fatigue of the elastomeric component and wear on the metallic fluid end. It is expected that the wear material will be consumed over time by the high pressure dynamic contact of the reciprocating plunger. When wear occurs, the volume of the packing assembly declines, but the axial load from the elastomeric component will keep the sealing surfaces continuously engaged. It is preferred that periodically the gland nut is adjusted to squeeze the packing to a nearly 100% volume fill condition.

This claimed subject matter can have other aspects such that it is not limited to those disclosed above, including a symmetric shape and a unitized assembly. Two wear components can engage a central elastomeric component at each end, helping ensure proper installation in part because the packing has no directional dependence for installation. The elastomeric component can have a concave, or recessed inner diameter between the two end inner diameters so that corresponding outer diameter shoulders on the wear components can mechanically engage the elastomeric component. A second wear component positioned on the upstream side of the packing assembly may provide a further benefit for a well service pump used in well completions. These pumps primarily pump sand, known in the industry as a proppant, down hole into shale formations. Proppant laden water contacts the plunger as the plunger reciprocates within the fluid end. A sizeable annulus must be maintained between the metallic plunger and metallic fluid end. The sizeable annulus assists in preventing granules of sand from becoming wedged between the two metallic surfaces and scoring the plunger's surface. The sizable annulus may also create a large extrusion gap for the packing assembly on the upstream side. Having a wear component engaging the large upstream annulus is preferred over the softer elastomeric component since extrusion will be lessened.

The presently claimed subject matter spreads the contact load of the wear component with the plunger over a large surface of the plunger and can be made of materials with relatively low coefficients of friction such as Ultra High Molecular Weight Polyethylene ("UHMW"), and lubrication is not necessarily required. Note, however, that the claimed subject matter is not limited to fabrication from such materials and that some embodiments may use other materials.

Illustrative embodiments of the subject matter claimed below will now be disclosed. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
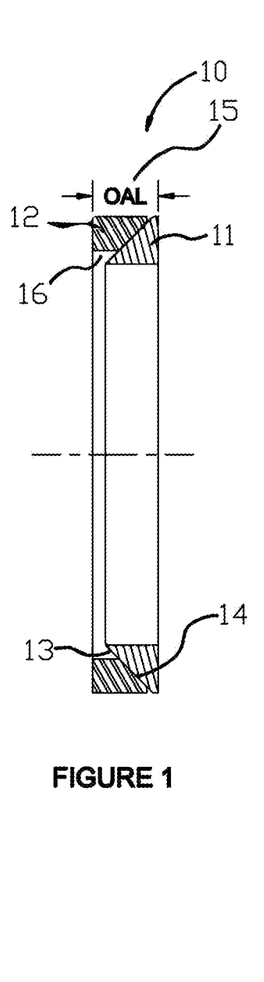
FIG. 1 is a cross-sectional view of an example of a packing assembly in its free state in accordance with one or more embodiments.

FIG. 1 is an example of the claimed subject matter in its free state in accordance with one or more embodiments. A packing assembly 10 is comprised of a wear component 11, or wear ring, and an elastomeric component 12, or elastomeric ring. The wear ring 11 is a wear component and has a tapered surface 13 engaging with the tapered surface 14 of the elastomeric ring 12. The surfaces 13, 14 are shown in FIG. 1 as fully tapered across the entire surface. In some embodiments, however, the engaging surfaces of the wear component 11 and the elastomeric component 12 may be only partially tapered. Accordingly, the outer diameter surface 13 of the wear component 11 is at least partially tapered and engages the inner diameter 14 of the elastomeric component 12 that is also at least partially tapered. The outer diameter surface of the elastomeric component 12 engages the stuffing box and the inner diameter surface of the wear component 11 engages the dynamic surface of the plunger in a manner shown in FIG. 2 and described below.

Materials with wear resistance qualities and relatively rigid mechanical properties are best suited for the wear ring 11. Recommended materials with wear include, but are not limited to hard urethanes, Ultra High Molecular Weight Polyethylene ("UHMW"), Polytetrafluoroethylene ("PTFE"), plastic polymer materials and compounds comprising a plastic material. Composite fabric and elastomer blends, or combinations thereof also can be suitable. The modulus of elasticity should be low enough that the wear material is pliable enough to reform when adjusted in the stuffing box. Low friction is also desired for the wear material to improve efficiency and reduce friction generated heat. Recommended materials for the elastomeric ring 12 include, but are not limited to natural rubber, nitrile butadiene rubber ("NBR", sometimes called "nitrile rubber"), Carboxylated Nitrile ("XNBR"), Hydrogenated Nitrile Butadiene Rubber ("HNBR", also known as Highly Saturated Nitrile ("HSN")), neoprene, urethanes with good elastomeric properties and other elastomers exhibiting good compression set resistance, or combinations thereof.

Figure 2:
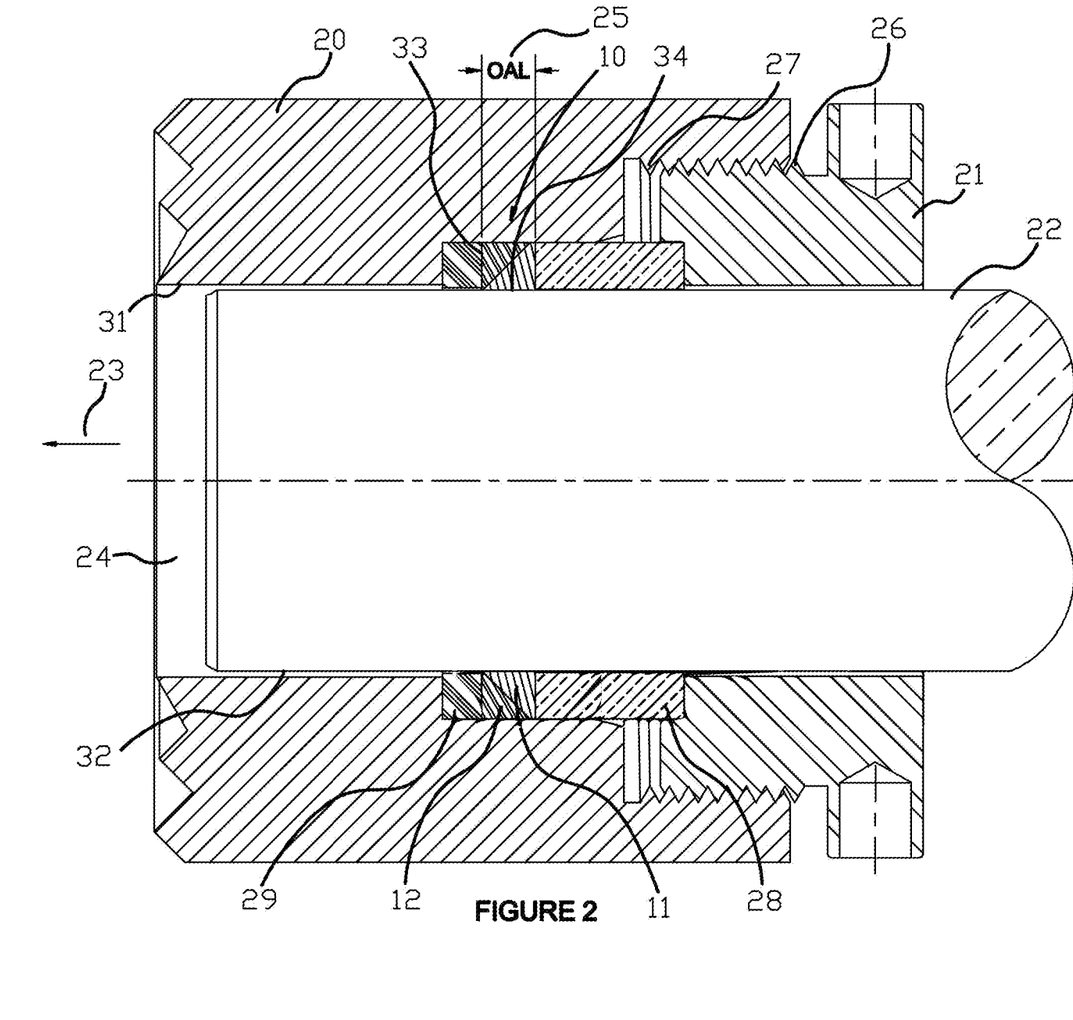
FIG. 2 is a cross-sectional view of the packing assembly illustrated in FIG. 1, but in an adjusted stuffing box within a fluid end.

Referring also now to FIG. 2, packing assembly 10 is positioned within a fluid end 20 and has taken the shape of the constraining rigid components, usually metallic, neighboring the packing assembly 10. The overall length 15 ("OAL") in FIG. 1 has been reduced to the overall length 25 in FIG. 2 by reshaping the elastomeric ring 12 to fill space like the volume 16 created by the free shape. It is preferred that the packing assembly 10 completely occupy the space created when gland nut 21, or packing nut, is tightened. With 100% volume fill, there is little movement of the packing assembly 10 during the pulsation of pressure generated when the plunger 22 advances in the direction 23 to displace fluid from the fluid end cavity 24. It is also desired that the elastomeric ring 12 does not contact the plunger 22, but instead contacts the wear ring 11 to avoid high friction wear from the elastomer on the dynamic surface of the plunger 22.

The gland nut 21 is threadably engaged with the fluid end 20, in this case with male threads 26 on the gland nut 21 and female threads 27 within the fluid end 20. Torque on the gland nut 21 generates an axial load on the packing assembly 10, in this case through a bushing 28. A second bushing 29 can also be used to help prevent upstream extrusion of the packing assembly 10, since the fluid end bore 31 often does not receive the plunger 22 tightly and creates a relatively large annulus 32, and a large annulus can result in extrusion of the packing assembly 10. The axial load generated by the torque placed upon gland nut 21 ultimately squeezes the packing assembly 10 to form against the surfaces of the more rigid neighboring components. As the wear ring 11 suffers material loss and the volume of the packing assembly is reduced, the gland nut 21 can be tightened to add axial compression to the packing assembly 10.

The tapered surfaces 13, 14 transfer some of the axial load into radial forces between the wear ring 11 and the plunger 22, and the elastomeric ring 12 and the fluid end 20. This initiates a seal so that when the plunger 22 is driven in the direction 23 to displace fluid, the pressure is placed upon the leading surface 33 of packing assembly 10 and generates additional axial force to the packing assembly 10. As pressure increases, so do the radial forces needed to generate a seal. A long contact surface 34 is desirable between the wear ring 11 and the plunger 22. It is expected that pressure driven fluid will partially penetrate the contact surface 34, but a longer surface will make it more difficult for a leak to initiate. Multiple packing assemblies 10 can also be stacked in a series within a longer stuffing box. This increases friction and reduces pump efficiency, but further prevents a leak.

Figure 3:
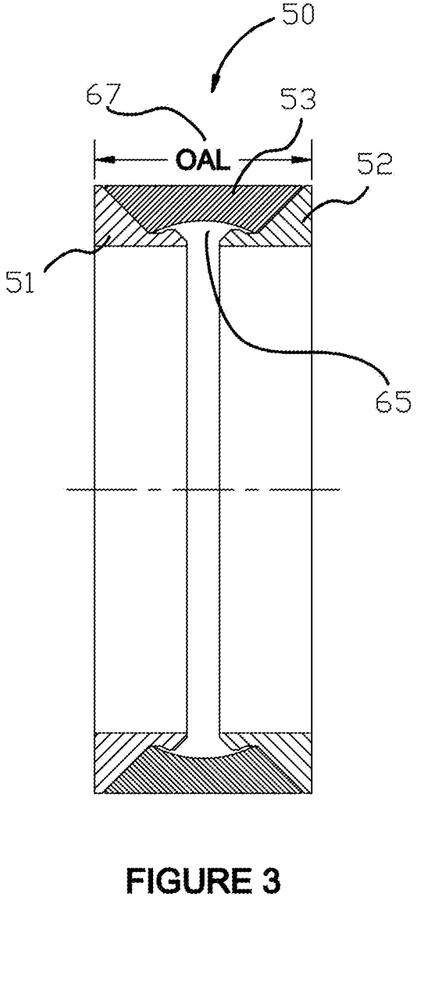
FIG. 3 is a cross-sectional view of another example of a packing assembly in its free state, but with a symmetric and unitized assembly, in accordance with one or more embodiments.
Figure 4:
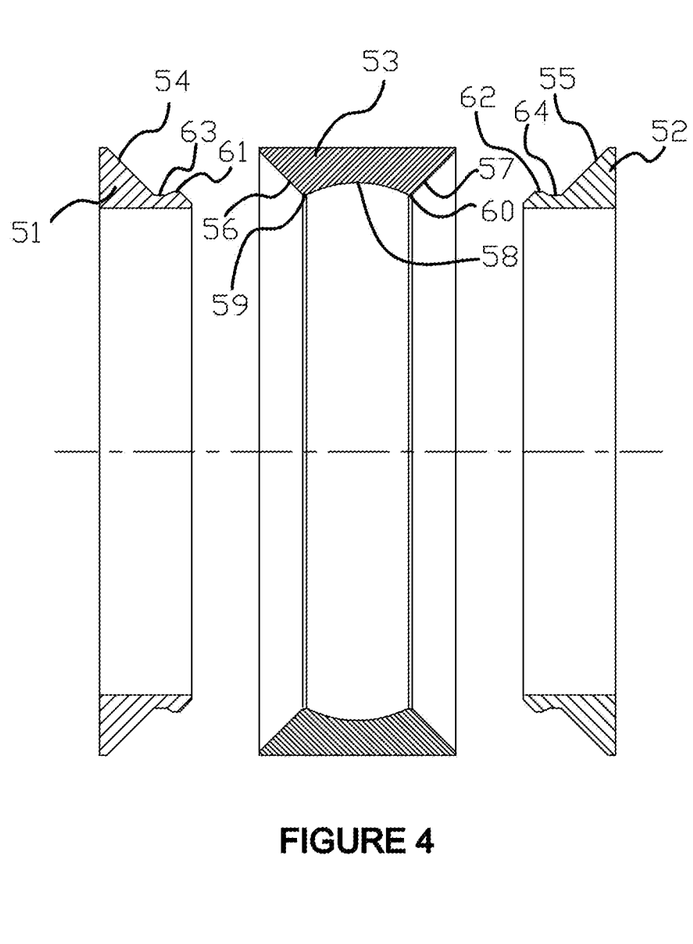
FIG. 4 is an exploded cross-sectional view of FIG. 3.

FIG. 3 is another example of the subject matter claimed below in accordance with one or more embodiments, but with the addition of a unitized packing assembly 50. The unitized packing assembly 50 is comprised of two wear rings 51, 52 and a central elastomeric ring 53. Looking also at FIG. 4, the wear rings 51, 52 have tapered surfaces 54, 55 to correspond with the elastomeric ring's 53 tapered surfaces 56, 57. The elastomeric ring 53 has a recessed inner diameter 58 between outward smaller diameters 59, 60. The wears rings 51, 52 have protruding outer diameters 61, 62 that are greater than the interior groove diameters 63, 64. Upon assembly the elastomeric ring's 53 smallest diameters 59, 60 are stretched over the wear rings' protruding diameters 61, 62 and snap into position as seen in FIG. 3 to keep the assembly intact during installation.

Figure 5:
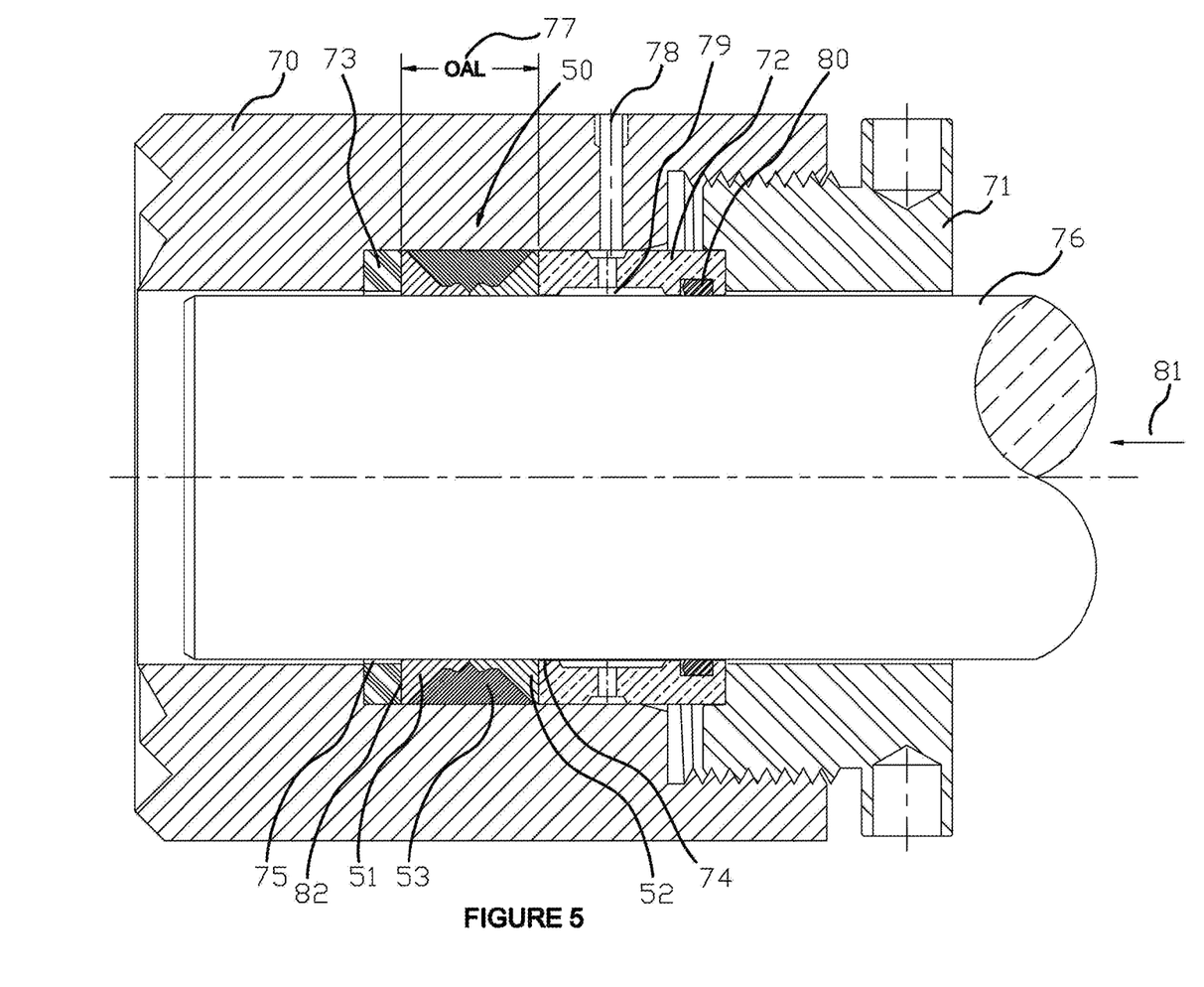
FIG. 5 is a cross-sectional view of the packing assembly in FIG. 3, but in an adjusted stuffing box within a fluid end.

FIG. 5 is the packing assembly 50 in FIG. 3, but installed and adjusted in a fluid end 70. FIG. 5 represents a typical well service fluid end assembly used to pump proppant into shale formations. Here, the packing assembly 50 is axially loaded by the gland nut 71 via a lantern ring 72. The packing assembly 50 is supported on its upstream side by a ring 73 known in the industry as a "junk ring". The lantern ring 72 serves as a bushing for the plunger 76 and tightly receives the plunger 76 creating a very small annulus 74. The junk ring 73 defines a very large annulus 75 to prevent proppant suspended in the fluid being pumped to be wedged between the junk ring 73 and the plunger 76.

Extrusion may occur in both annuli 74, 75, but having thick sections of wear ring material on the wear rings 51, 52 exposed to the extrusion gaps 74, 75 can mitigate extrusion as opposed to the response of the elastomeric material. The free overall length 67 of the packing assembly 50 in FIG. 3 is longer than the adjusted overall length 77 in FIG. 5. The cavity 65 as depicted in FIG. 3 serves as a place for the elastomeric ring 53 to move into when axially compressed in a nearly 100% volume fill condition.

Traditional well service pumps require grease or oil lubrication to prevent current packing from rapid failure. The fluid end 70 has a lubrication port 78 that delivers pressurized lubricant to a pocket 79 on the interior of the lantern ring 72. A wiper or seal 80 keeps the lubricant contained and the reciprocating plunger 76 drags lubricant between the plunger 76 and packing assembly 50 with surface tension. Packing assembly 50 is pressure energized when the plunger 76 is forced in the forward direction 81 and generates pressure on the packing assembly's 50 surface 82. The elastomeric ring 53 supplies a sufficient axial load to initiate a seal so the pressure on the packing surface 82 compounds the axial force. The axial force is partially converted into radial force on the wear rings 51, 52 via their tapered surfaces 54, 55. The pliable wear ring material cinches the plunger 76 more tightly as pressure increases.

It has been found that fluid pressure becomes trapped in what remains of the cavity 65 while the assembly 50 is in operation. This phenomenon can reduce or eliminate the need for further adjustment of the gland nut 71 as the wear rings 51, 52 lose mass from friction since high pressure is maintained on the tapered surfaces 54, and 55 at all points in the plunger's 76 cycle, including the suction stroke. This brings unwanted radial load to the wear rings 51, 52 during the suction stroke since it will accelerate wear, but there is great benefit to not depending on a mechanic to frequently adjust the gland nut 71. Thus, the pressure trap just described can eliminate, or at least reduce, the need for constant attention to tightening the gland nut 71 found in conventional well service pumps.

Figure 6:
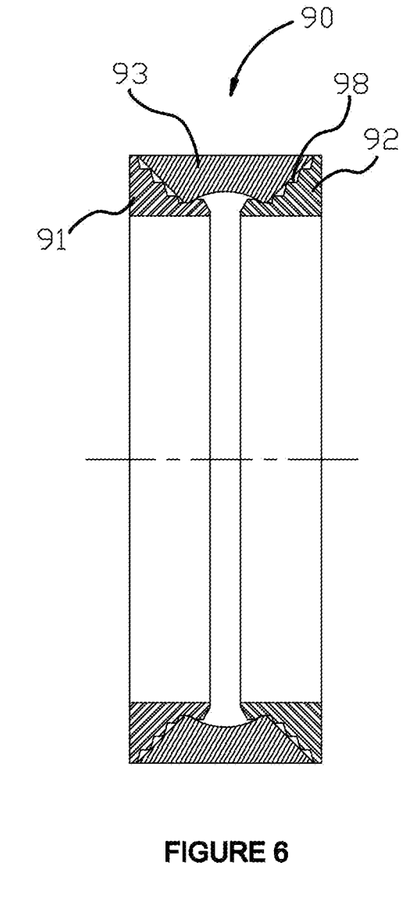
FIG. 6 is a cross-sectional view of another example of a packing assembly in accordance with one or more embodiments, but with a contact surface between the wear component and the elastomer designed to improve axial compression of the elastomer without translating unnecessary radial force from the wear component onto the plunger.

FIG. 6 is another example of the subject matter claimed below in accordance with one or more embodiments. FIG. 6 shows a packing assembly 90 with dissimilar contact surfaces between the wear rings 91, 92 and the elastomeric ring 93. It is advantageous to maximize the amount of energy stored within the elastomeric ring 93 when adjusted in the stuffing box. It is also advantageous to maximize the contact length 94 of the wear rings 91, 92 with the radial load transmitted from the axial load to be distributed as evenly as possible across the length 94. Referring back to FIG. 4, it has been found that the angles off the axis of the surface 54 of the wear ring 51 and the surface 56 of the elastomeric ring 53 can be higher than 60° and still achieve a tight seal. The larger the angle, the less radial force is applied between the wear ring and the plunger. A smaller angle between the surface 54 and the axis improves radial contact pressure, but also accelerates wear.

Figure 7:
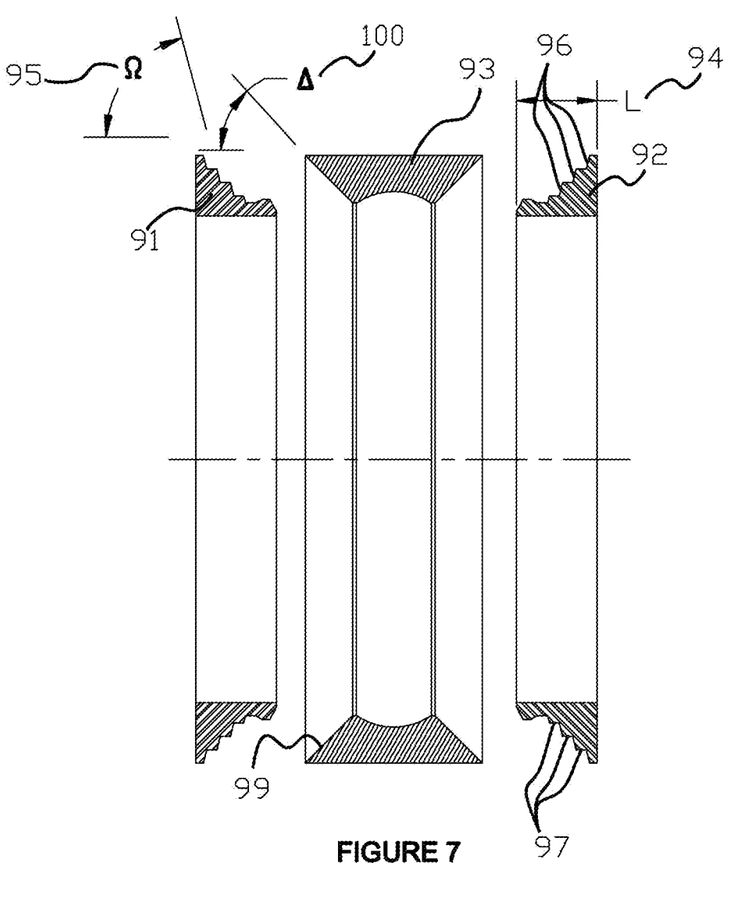
FIG. 7 is an exploded cross-sectional view of the packing assembly in FIG. 6.

Looking now to FIG. 7, a larger angle 95 (Ω) can be achieved by segmenting the tapered surfaces 96 with axially parallel segments 97. The surface 99 of the elastomeric ring 93 could match the contour of the wear ring surfaces 96, 97, but the angle 100 (Δ) can also be smaller than the angle omega 95. In FIG. 6, voids 98 provide an additional area for rubber displacement, improving the energy stored within elastomeric element 93. As the wear rings 91, 92 succumb to friction and become smaller, added energy stored within the elastomeric element 93 keeps the initiating seal intact for a longer period of time.

Figure 8:
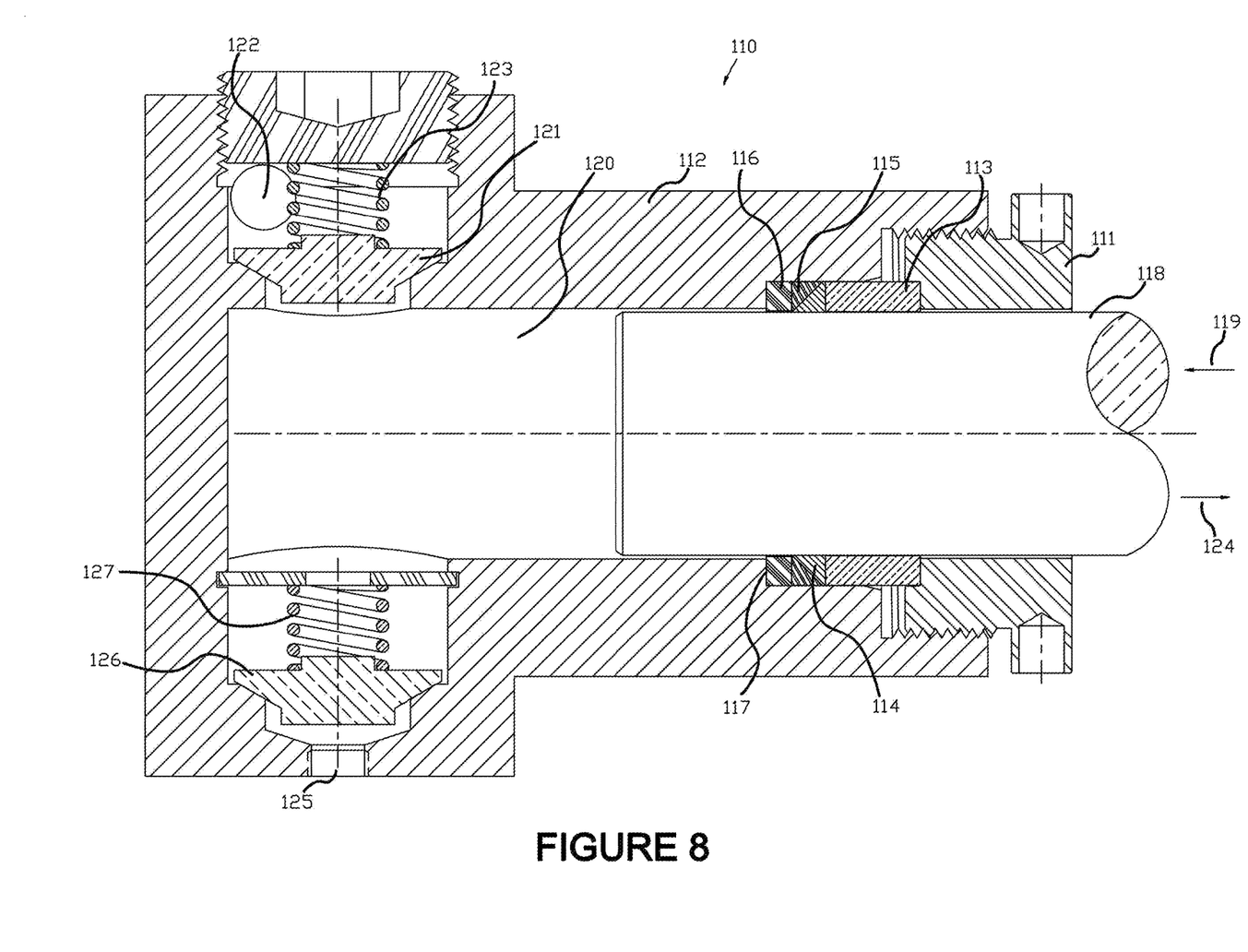
FIG. 8 is a cross-sectional view of the packing assembly in a more complete fluid end.

FIG. 8 is a more complete picture of a pump's fluid end assembly 110. A gland nut 111 is threadably connected to the fluid end 112. Torque applied to the gland nut 111 drives a bushing 113 into the packing assembly's wear ring 114 and compresses the packing assembly's elastomeric ring 115 into a junk ring 116 that is supported by the fluid end's 112 shoulder 117. When the plunger 118 is forced in the forward direction 119, fluid in the cavity 120 is displaced and driven past the discharge check valve 121 and out a port 122. A spring 123 biases the check valve 121 into a normally closed position. When the plunger 118 has fully traveled in the forward direction 119 and occupies the cavity 120, the plunger now is forced in the reverse direction 124. Fluid from a suction manifold (not shown) enters a port 125 and is sucked past the suction check valve 126 with the vacuum created with the plunger's 118 departure from the cavity 120. Often suction manifolds are pressurized to assist in the rapid filling of the cavity 120. A spring 127 keeps the suction check valve in the normally closed position so that when the plunger 118 moves in the forward direction 119 again, fluid will not pass by the suction valve 126. The wear ring 114 and elastomeric ring 115 form a seal to prevent fluid from escaping past the plunger 118.

Figure 9:
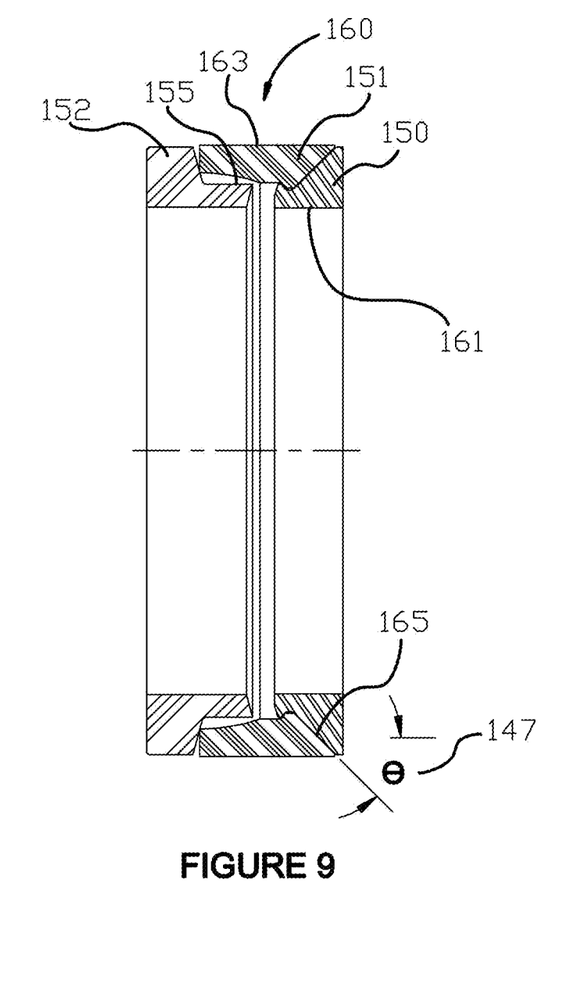
FIG. 9 is a cross-sectional view of another example of a packing assembly in its free state in accordance with one or more embodiments, including a junk ring specifically designed for well service pumps.

Looking now to the Figures collectively, another example of the claimed subject matter is depicted in accordance with one or more embodiments. The subject matter is in its free state (FIG. 9), housed within a stuffing box (FIG. 10), and adjusted with compression within a stuffing box (FIG. 11). This assembly 160 includes a wear ring 150, an elastomeric ring 151 and a bearing ring 152.

Figure 10:
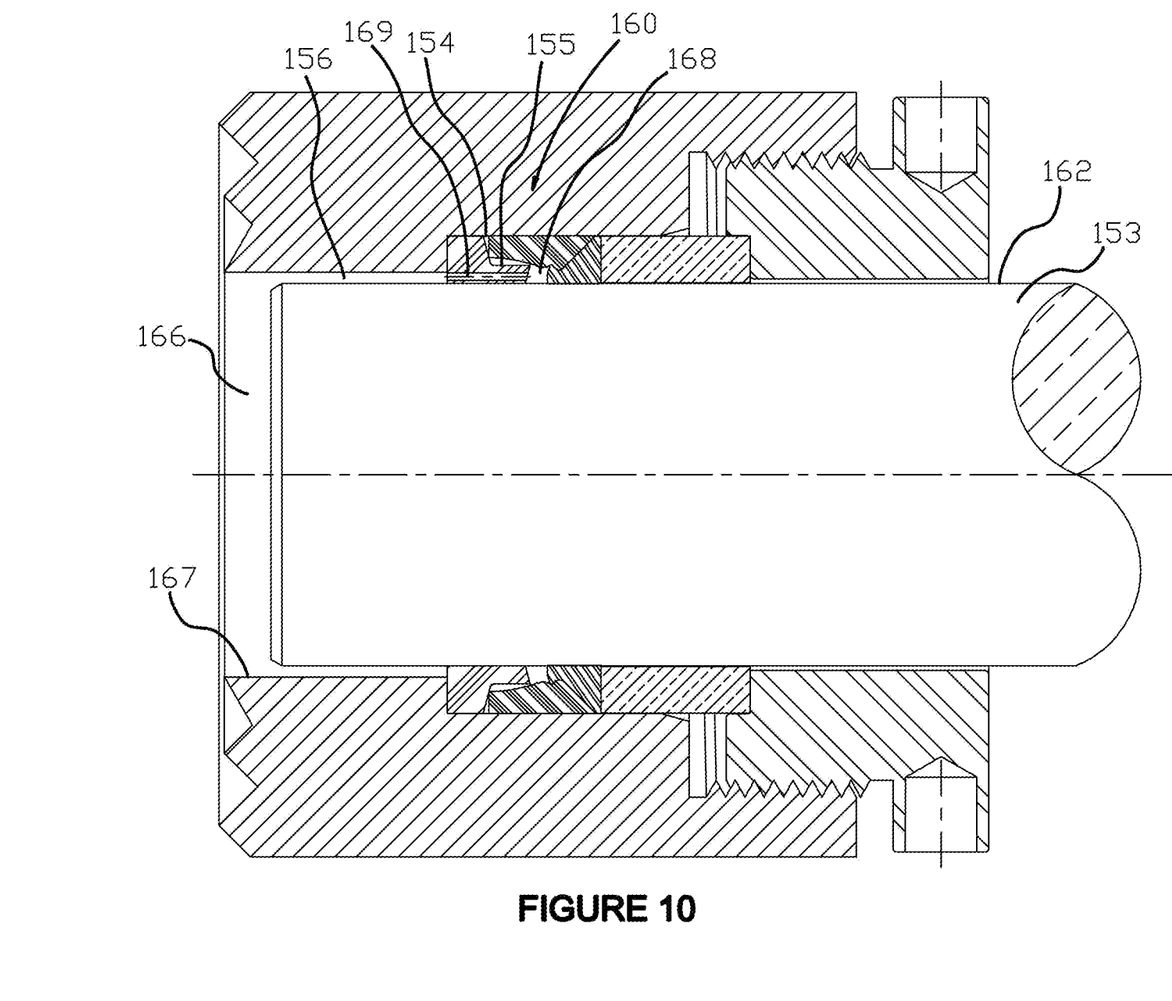
FIG. 10 is a cross-sectional view of the packing assembly illustrated in FIG. 9, but within a non-adjusted stuffing box within a fluid end.
Figure 11:
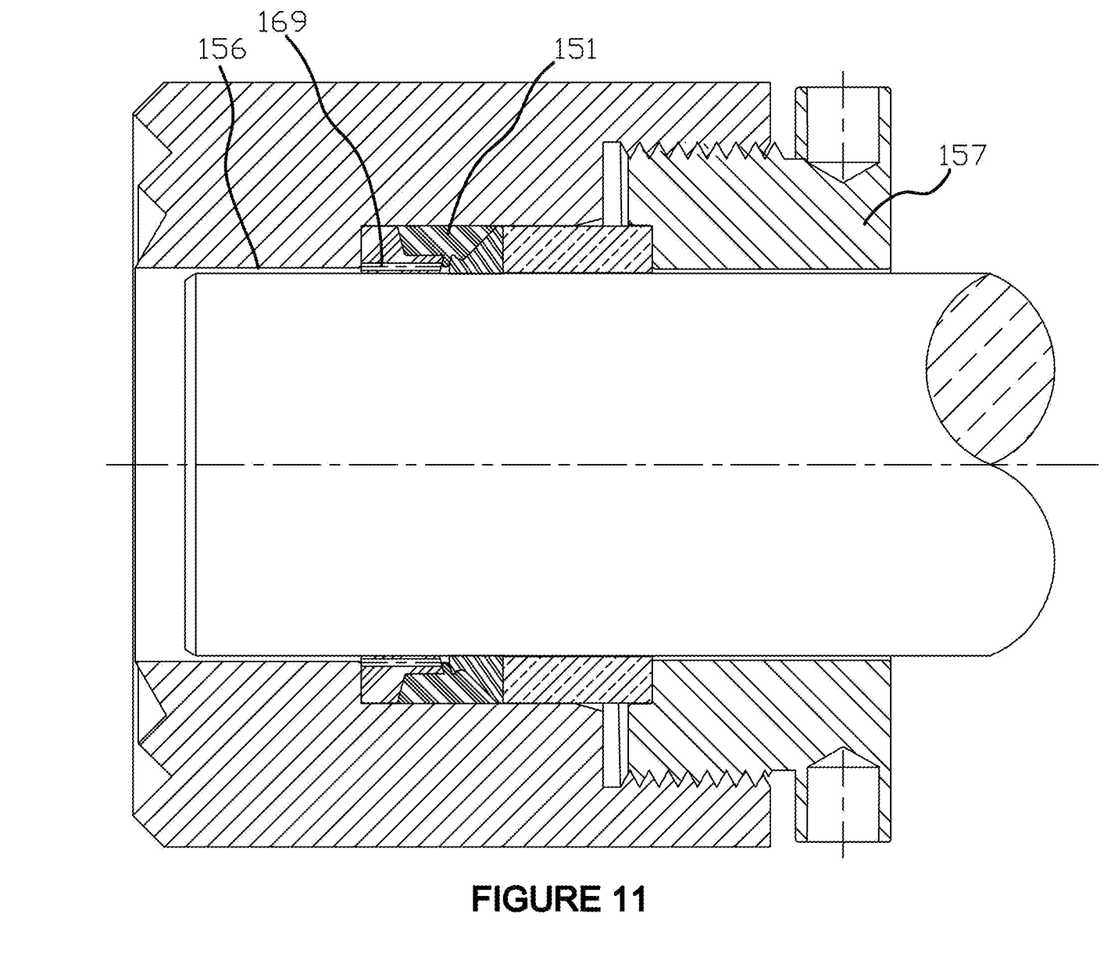
FIG. 11 is a cross-sectional view of the packing assembly illustrated in FIG. 9, but within an adjusted stuffing box within a fluid end.

The bearing ring 152 is closely received between the plunger 153 and the stuffing box bore 154 (FIG. 10). The bearing ring 152 is shouldered and has a section 155 that axially overlaps the elastomeric ring 151, shielding it from dynamic contact with the plunger 153. In the case of well service pumps with abrasive media, metallic or relatively high modulus materials are not good options for the bearing ring 152. Granules such has proppant can embed themselves between the bearing ring 152 and the plunger 153, abrading our potentially scratching the plunger 153. Softer materials absorb the abrasive granules to avoid wedging them into a plunger. For the bearing ring 152 in this embodiment, the recommended materials cited for the wear ring 11 apply. The bearing ring 152 serves as support to help keep the plunger 153 coaxial, and it also serves as a barrier preventing the elastomeric ring 151 from extruding into the annulus 156. A large annulus 156 is used in well service pumps with abrasive media to prevent large granules from wedging between the metallic plunger 153 and fluid end bore 167.

During installation of the packing assembly 160, air can be trapped in cavities 168 between the wear ring 150, the elastomeric ring 151, and the bearing ring 152, which because of its lower modulus material, is capable of forming a seal with the plunger 153. Upon running the pump, a pressure trap within the cavity 168 can cause extrusion of the soft bearing ring 152 into the annulus 156. This can add unwanted heat, friction and loss of material. A vent 169 can be used to prevent the soft bearing ring 152 to form an unwanted seal between the plunger 153 and the stuffing box bore 154. The vent 169 depicted in FIGS. 10 and 11 is an axial hole, but a vent is not limited to an axial hole since any means to bleed pressure, such as notches, would be suitable.

The contact angle between the wearing ring 150 and the elastomeric ring 152 as depicted by the angle θ 147 (FIG. 9) can be in excess of 60° and still achieve a seal, but this also employs high initial forces during energizing with the gland nut 157 (FIG. 11). If the angle θ 147 is 45° or lower, the packing assembly 160, comprising of the wear ring 150 and the elastomeric ring 151, may self-energize without compression from the gland nut 157 (FIG. 10). It is generally preferred to manufacture the wear ring 150 with an inner diameter 161 that is less than the outer diameter 162 of the plunger 153. Also, the outer diameter 163 of the elastomeric ring 151 should be initially manufactured larger than the inner diameter 154 of the stuffing box bore 154. When the elastomeric ring 151 and the wear ring 150 are pressed into the stuffing box bore 154 during installation, radial compression occurs between the tapered contact surfaces 165, forming a seal that self energizes when pressure is applied within the cavity 166.

Figure 12:
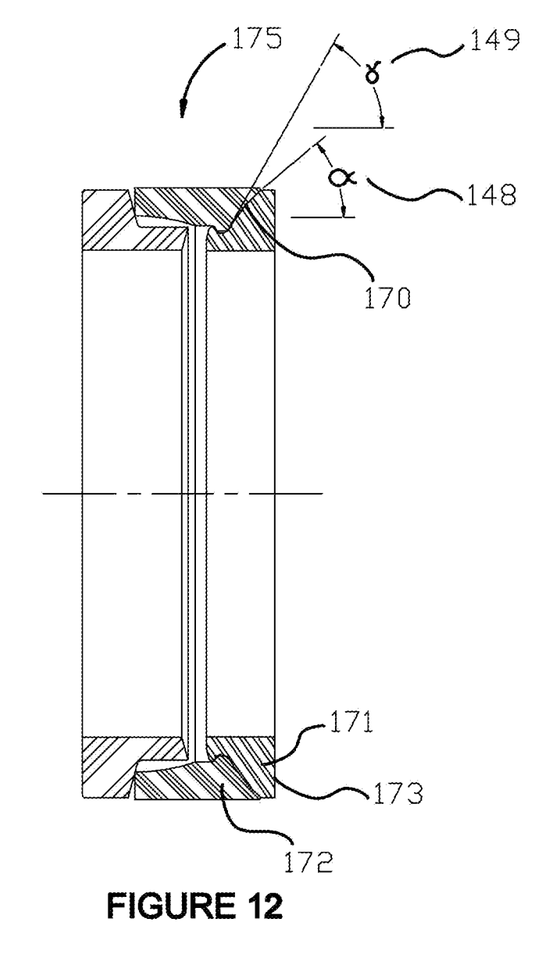
FIG. 12 is a cross-sectional view of another example of a packing assembly in its free state in accordance with one or more embodiments, including arced surfaces where the wear ring contacts the elastomeric ring.

Another aspect is shown with a packing assembly 175 in FIG. 12 utilizing an arced contact surface 170 between the wear ring 171 and the elastomeric ring 172. The tangent angle α 148 at the outer diameters of the wear ring 171 and the elastomeric ring 172 can be 45 degrees or less to achieve self-energization without axial compression. In an effort to reduce the radial load between the wear ring and the plunger (not shown) and extend the wear ring's 171 longevity, the tangent angle δ 149 can be larger than 45 degrees and still maintain self-energization without axial compression from the gland nut (not shown). The surface 173 located on the downstream end of the packing assembly 175 is preferably at 90 degrees to the axis as well as the surface of the downstream metallic bushing it abuts (not shown). A tapered surface would encourage extrusion into the annulus between the downstream bearing and the stuffing box bore or the plunger.

Figure 13:
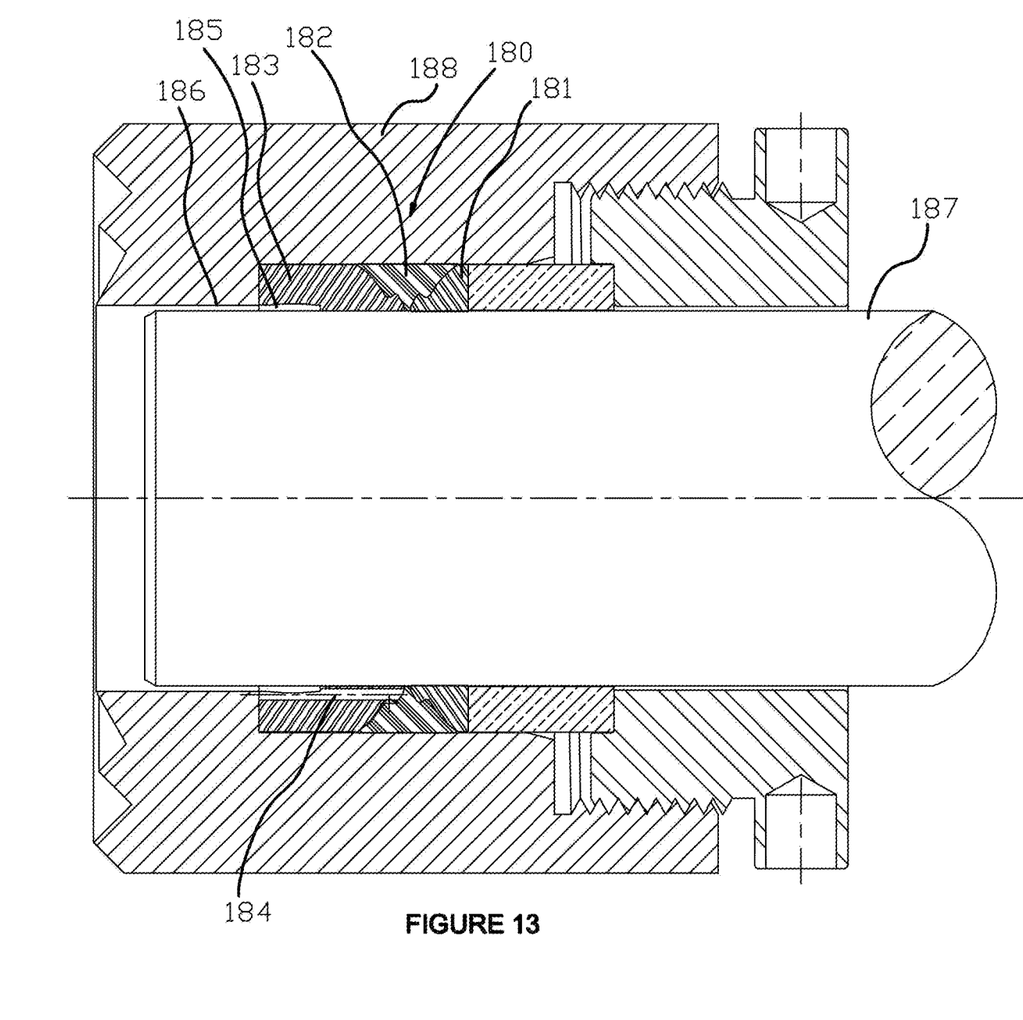
FIG. 13 is a cross-sectional view of another example of a packing assembly in an adjusted stuffing box within a fluid end in accordance with one or more embodiments, having a cavity within the non-metallic bearing ring to absorb displaced packing assembly material due to thermal expansion.

FIG. 13 is another example of the subject matter housed within an adjusted stuffing box. The packing assembly 180 is comprised of a non-metallic wear ring 181, an elastomeric ring 182, and a non-metallic bearing ring 183. The packing assembly 180 has been tightly adjusted and the elastomeric ring 182 has filled nearly 100 percent of the volume between the wearing ring 181 and the bearing ring 183. During operation of the pump, friction generated between the plunger 187 and the packing assembly 180 adds heat to the packing assembly 180. Fluid pressure trapped within the packing assembly 180 is able to escape through a vent 184. The non-metallic materials comprising the packing assembly 180 have a coefficient of thermal expansion that is far greater than the surrounding metallic fluid end 188 it is contained within. The axial load will increase across the length of the packing assembly 180 and the non-metallic bearing ring 183 is able to deform into the cavity area, in this case an annulus 185. In the absence of a cavity to accommodate thermal expansion, pressure on the packing assembly can be great enough to extrude the bearing ring 183 into the upstream annulus 186, generating even more heat and permanently losing the material so that when the non-metallic materials cool, the volume fill of the elastomeric ring 182 is less than 100 percent.

The presently disclosed sealing or packing assembly reduces wear and thereby lengthens the life and increases the reliability of the packing assembly. It also reduces, and perhaps even eliminates, the need for lubrication. The disclosed design does this by using the wear component to bias the elastomeric component away from the dynamic surface of the plunger such that the elastomeric component does not actually contact dynamic surface of the plunger. Accordingly, the wear component, made of high wear materials, absorbs the wear caused by the dynamic seal rather than the elastomeric component.

Those in the art will recognize that the term "wear" in the phrase "wear component" is a term of art in the arts relevant to the presently claimed subject matter. Tools such as the one disclosed herein used in drilling, stimulating, and/or completing hydrocarbon wells are subjected to many kinds of wear from, for example and without limitation, high pressures and entrained particulates. The relevant art(s) recognize that certain classes of materials withstand these kinds of wear to which downhole and wellbore equipment is subjected better than other classes of materials.

The art(s) refer to these classes as "wear" materials and those in the art(s) will be able to readily identify those materials. Some examples are given above. A "wear component" is one that is fabricated from one or more of these "wear materials". Accordingly, those skilled in the art(s) will readily be able to understand and scope and meaning of the term "wear component".

The wear component disclosed herein is a wear ring as is disclosed above. However, the wear ring is, by way of example and illustration, but one means for sealably engaging the packing and forming a dynamic seal with the plunger. Other embodiments may employ other equivalent means for performing these functions. Those skilled in the art having the benefit of this disclosure may appreciate such other means as may be used in other embodiments.

Furthermore, the gland nut disclosed herein is, by way of example and illustration, but one means for compressing the packing. Other embodiments may employ other equivalent means for performing this function. Those skilled in the art having the benefit of this disclosure may appreciate such other means as may be used in other embodiments.

Still further, the packing shown herein is an elastomeric component. The elastomeric component is, by way of example and illustration, but one means for energizing and sealing as described above. Other embodiments may employ other equivalent means for performing these functions. Those skilled in the art having the benefit of this disclosure may appreciate such other means as may be used in other embodiments.

This concludes the detailed description. The particular embodiments disclosed above are illustrative only, as the claimed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the claims. Accordingly, the protection sought herein is as set forth in the claims below.

What is claimed is:

1. A packing assembly comprising:
    a first plastic wear ring defining a downstream end of the packing assembly with an inner diameter and at least a partially tapered outer diameter wherein, in use, the inner diameter dynamically contacts a plunger to form a dynamic seal;
    an elastomeric ring positioned upstream of the first wear ring with an outer diameter and at least a partially tapered inner diameter on a first end to engage the outer diameter of the first wear ring, and at least a partially tapered inner diameter on a second end that, in use, engages a stuffing box on the outer diameter and is axially compressed within the stuffing box; and
    a second plastic ring positioned upstream of the elastomeric ring with an inner diameter and at least a partially tapered outer diameter to engage the second end of the elastomeric ring and, in use, the inner diameter dynamically contacting the plunger.

2. The packing assembly of claim 1, wherein the second plastic ring has a vent allowing pressure to pass through its axial length.

3. The packing assembly of claim 1, wherein the second plastic assembly has a shoulder within its inner diameter and the smaller inner diameter is positioned on the end engaging the elastomeric ring.

4. A packing assembly comprising:
    a first plastic wear ring with an inner diameter and at least a partially tapered outer diameter;
    an elastomeric ring with an outer diameter and at least a partially tapered inner diameter on a first end to engage the outer diameter of the wear ring, and a second end; and
    a second plastic ring to engage the second end of the elastomeric ring, the second plastic wear ring having a vent to pass fluid pressure from a cavity defined by the first plastic wear ring, the elastomeric ring, and the second plastic ring and through the axial length of the second plastic ring to the exterior surface of the packing assembly.

5. The packing assembly of claim 4, wherein the second plastic assembly has a shoulder within its inner diameter and the smaller inner diameter is positioned on the end engaging the elastomeric ring.

6. The packing assembly of claim 4, wherein the vent communicates the fluid pressure between an area within the first and second wear rings and the exterior of the packing assembly.

* * * * *